US 6,867,571 B2

(12) United States Patent
Nebon

(10) Patent No.: US 6,867,571 B2
(45) Date of Patent: Mar. 15, 2005

(54) DEVICE AND METHOD FOR CONTROLLING A SWITCHING POWER SUPPLY AND CORRESPONDING SWITCHING POWER SUPPLY

(75) Inventor: Jerome Nebon, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 68 days.

(21) Appl. No.: 10/460,039

(22) Filed: Jun. 11, 2003

(65) Prior Publication Data

US 2004/0027098 A1 Feb. 12, 2004

(30) Foreign Application Priority Data

Jun. 13, 2002 (FR) .............................................. 02 07280

(51) Int. Cl.$^7$ ................................................ G05F 1/40
(52) U.S. Cl. ........................ 323/225; 323/284; 323/288
(58) Field of Search ................................ 323/222, 225, 323/282, 284, 288, 290

(56) References Cited

U.S. PATENT DOCUMENTS

| | | | | |
|---|---|---|---|---|
| 5,847,554 A | * | 12/1998 | Wilcox et al. | 323/282 |
| 6,225,795 B1 | | 5/2001 | Stratakos et al. | 323/284 |
| 6,307,355 B1 | * | 10/2001 | Nguyen | 323/282 |
| 6,377,032 B1 | | 4/2002 | Andruzzi et al. | 323/288 |
| 6,492,794 B2 | * | 12/2002 | Hwang | 323/285 |

FOREIGN PATENT DOCUMENTS

EP 0884746 12/1998

OTHER PUBLICATIONS

French Preliminary Search Report dated Mar. 14, 2003 for French Application No. 0207280.

* cited by examiner

Primary Examiner—Jessica Han
(74) Attorney, Agent, or Firm—Lisa K. Jorgenson; Stephen Bongini; Fleit, Kain, Gibbons, Gutman, Bongini & Bianco P.L.

(57) ABSTRACT

A control device is provided for a switching power supply having an output that supplies an output voltage. The switching power supply includes an inductor and two changeover switches for controlling coupling of the inductor. The control device includes a first capacitor for charging with continuous current from a 0V voltage level, a second capacitor for discharging of the continuous current from a predetermined voltage level that is greater than the voltage level of a DC power supply, and a comparison circuit. The comparison circuit compares the output voltage of the switching power supply with voltage levels of the first and second capacitors and generates control signals for controlling the two changeover switches of the switching power supply. Also provided are switching power supplies having such control devices and a method for controlling a switching power supply.

16 Claims, 3 Drawing Sheets

DEVICE AND METHOD FOR CONTROLLING A SWITCHING POWER SUPPLY AND CORRESPONDING SWITCHING POWER SUPPLY

CROSS-REFERENCE TO RELATED APPLICATIONS

This application is based upon and claims priority from prior French Patent Application No. 02-07280, filed Jun. 13, 2002, the entire disclosure of which is herein incorporated by reference.

BACKGROUND OF THE INVENTION

1. Field of the Invention

The present invention relates to switching power supplies, and more particularly to control systems used to control the switching cells that form part of the structure of such power supplies.

2. Description of Related Art

Switching power supplies are the step-down or step-up transformer converters of DC-DC power. In the particular case of the step-down transformers, such power supplies conventionally include an inductor positioned, for example, on the output side of the converter. This inductor is connected by a first changeover switch to a DC-DC power supply, and to ground by a second changeover switch.

FIG. 1 illustrates the general structure of a conventional step-down transformer DC converter that is used to supply power to a load R. FIG. 2 shows timing charts indicating the evolution of the current circulating in the inductor and the variation of the control signals of the first and second changeover switches P and N, respectively. In switching power supplies of this type, the control circuit controls the first and second changeover switches so as to switch them in a way that prevents the current circulating through the inductor from becoming negative.

Normally, the control of the changeover switches is carried out on the basis of a measurement of the current circulating through the inductor that is made by using the appropriate current detectors. However, this causes significant inconveniences in terms of the power used and yield, especially for light loads.

SUMMARY OF THE INVENTION

In view of these drawbacks, it is an object of the present invention to overcome these drawbacks and to provide a control device for a switching power supply that makes it possible to predict the moment in which the current circulating in the inductor shuts down in order to avoid the need for any current measuring device.

Another object of the present invention is to provide an improved method for controlling a switching power.

Yet another object of the present invention is to provide a switching power supply that incorporates an improved control method.

One embodiment of the present invention provides a control device for a switching power supply having an output that supplies an output voltage. The switching power supply includes an inductor and two changeover switches for controlling coupling of the inductor. The control device includes a first capacitor for charging with continuous current from a 0V voltage level, and a second capacitor for discharging of the continuous current from a predetermined voltage level that is greater than the voltage level of a DC power supply. The control device also includes a comparison circuit that compares the output voltage of the switching power supply with voltage levels of the first and second capacitors and generates control signals for controlling the two changeover switches of the switching power supply.

Further embodiments of the present invention provide switching power supplies having such control devices.

Another embodiment of the present invention provides a method for controlling a switching power supply having an output that supplies an output voltage. The switching power supply includes an inductor, two changeover switches for controlling coupling of the inductor, and a control circuit for controlling the changeover switches. According to the method, a first capacitor is charged with continuous current from a 0V voltage level, and a second capacitor is discharged of the continuous current from a predetermined voltage level that is greater than the voltage level of a DC power supply. The output voltage of the switching power supply is compared with voltage levels of the first and second capacitors and control signals for controlling the first and second changeover switches are generated based on the comparison.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Preferred embodiments of the present invention provide a control device for a switching power supply that includes an inductor and two control changeover switches for controlling the voltage level circulating in the inductor. This control device includes a first capacitor that is charged with continuous current from a 0V voltage level, a second capacitor that is discharged of the continuous current from a predetermined voltage level that is greater than the voltage level of the DC power supply, and a comparison circuit for comparing the rated output voltage of the power supply with the voltage of the first and second capacitors and generating the control signals for the first and second changeover switches.

In one embodiment, the comparison circuit includes a first comparator whose non-inverter terminal is connected at the output of the switching power supply and whose inverter terminal receives the voltage level of the first capacitor. Preferably, the comparison circuit includes a second comparator whose non-inverter terminal is connected to the output of the switching power supply and whose inverter terminal receives the voltage level of the second capacitor.

Another embodiment of the present invention provides a switching power supply that includes an inductor that is coupled to a DC power supply by a first changeover switch and to ground by a second changeover switch. The switching power supply also includes the above-described control device for the changeover switches.

A further embodiment of the present invention provides a switching power supply that includes an inductor having a first terminal coupled to a DC power supply and a second terminal coupled to the output of the power supply by a first changeover switch and to ground by a second changeover switch. The switching power supply also includes the above-described control device for the changeover switches.

Yet another embodiment of the present invention provides a control procedure for a switching power supply that includes an inductor, two changeover switches for controlling the voltage level circulating in the inductor, and a control device for the changeover switches. According to the procedure, a first capacitor is charged from a 0V voltage level, and a second capacitor is discharged of the continuous current from a predetermined voltage level that is greater than the voltage level of the DC power supply. The rated output voltage of the power supply is compared with the voltage of the first and second capacitors to generate the control signals for the first and second changeover switches.

Exemplary embodiments of the present invention will now be described in detail with reference to FIGS. 3–5.

Figure 3:
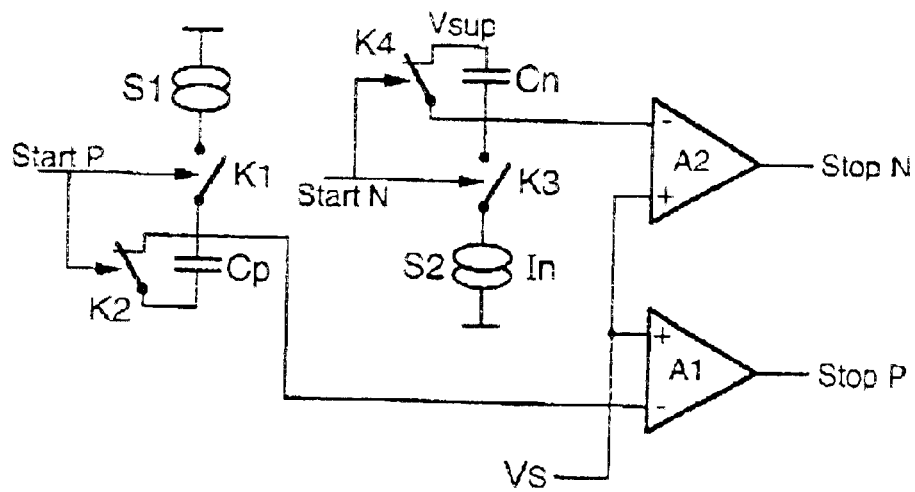
FIG. 3 is a block diagram of a control circuit of a step-down transformer DC-DC converter circuit according to a preferred embodiment of the present invention.

FIG. 3 illustrates a portion of a control circuit for a switching power supply. This control circuit portion is designed to be associated with a conventional DC-DC converter, such as the one described above with reference to FIG. 1. More specifically, it is designed to generate control signals ComP and ComN for the changeover switches of this converter. The generated signals are supplied to the converter so as to trigger the opening of these changeover switches.

Figure 1:
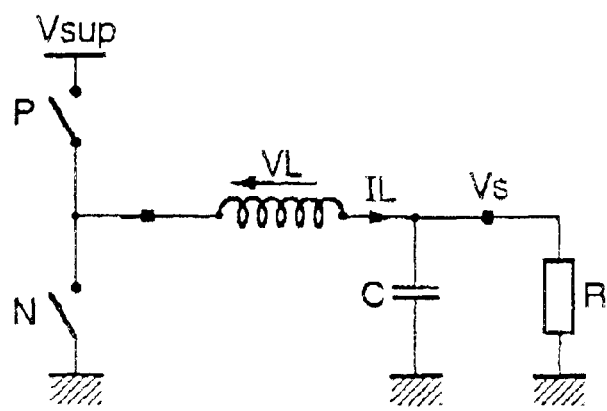
FIG. 1 illustrates the general architecture of a conventional step-down transformer DC-DC converter.

As can be seen in FIG. 3, the control circuit includes a first capacitor Cp, a second capacitor Cn, and two comparators A1 and A2. The comparators have operational transistors whose outputs generate the control signals StopP and StopN for the opening of the first and second changeover switches P and N, respectively, of the DC-DC converter (FIG. 1). These first and second capacitors Cp and Cn are each attached to the inverter terminal of a corresponding one of the comparators A1 and A2. The non-inverter terminals receive the output Vs of the converter.

As can be seen in FIG. 3, the terminal of the first capacitor Cp that is connected to the inverter terminal of the corresponding comparator A1 is also connected by a first changeover switch K1 to a DC power supply S1, which supplies a current Ip. A second changeover switch K2 is connected in parallel with the first capacitor Cp.

The first and second switches K1 and K2 are controlled for opening and closing by a control signal StartP in order to control the closing of the first changeover switch P of the converter. In this embodiment, a low level of this control signal StartP triggers the closing of the second changeover switch K2 and the opening of the first changeover switch K1, and a high level of this control signal StartP triggers the closing of the first changeover switch K1 and the opening of the second changeover switch K2.

The second capacitor Cn of the control circuit is connected to a DC power supply Vsup. A changeover switch K3 controls its discharge according to current In. In addition, a fourth changeover switch K4 is connected in parallel with this second capacitor Cn. These third and fourth changeover switches K3 and K4 are controlled by a control signal StartN in order to control the closing of the second changeover switch N of the converter. In this embodiment, a low level of this control signal StartN triggers the closing of the fourth changeover switch K4 and the opening of the third changeover switch K3, and a high level of this control signal StartN triggers the closing of the third changeover switch K3 and the opening of the fourth changeover switch K4.

It should be noted that the control signals StartP and StartN are generated in a conventional manner. Their generation will thus not be discussed in greater detail.

Figure 4:
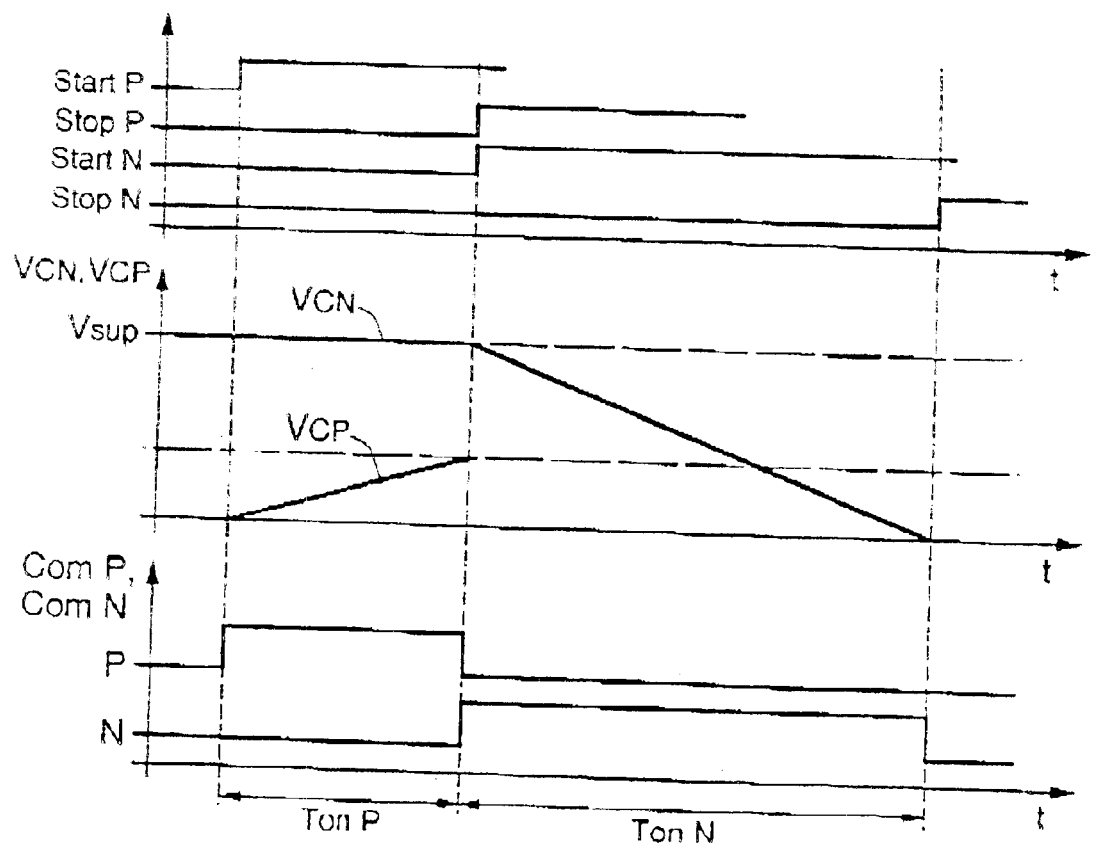
FIG. 4 shows the variation as a function of time of the major signals for the circuit of FIG. 3.

Referring now to FIG. 4, the operation of the control circuit described above will now be explained. At startup, the control signal StartP for controlling the closing of the first changeover switch P of the converter is positioned at a high level, and the control signal StartN for controlling the closing of the second changeover switch N of the converter is positioned at a low level. The first changeover switch K1 of the control circuit is thus closed and the second changeover switch K2 of this control circuit is opened.

Consequently, the first capacitor Cp is charged from a voltage level of 0V with a continuous current with a value Ip. As soon as the voltage level at the terminals of the first capacitor Cp reaches the output level Vs of the switching power supply, the control signal StopP generated by the first comparator A1 goes to the high level, so as to trigger the changeover of the control signal of the first changeover switch P of the converter to the low level and the consecutive opening of this switch.

Simultaneously, the control signal StartN of the second changeover switch N of the converter is positioned at a high level, so as to trigger the consecutive closing of this second changeover switch. This triggers a linear decrease of the current circulating in the inductor, and also triggers a discharge of the second capacitor Cn of the control circuit from a voltage level Vsup, with a constant current In.

As soon as the voltage level at the terminals of the second capacitor Cn reaches the voltage output level Vs of the power supply, the control signal StopN of the second changeover switch N of the power supply passes to the high level, and consequently triggers an opening of this second changeover switch.

The circuit that has just been described is used to generate control pulses for the changeover switches of the power supply at the expiry of predetermined periods TonP and TonN, which correspond respectively to the conduction periods of the first and second changeover switches, or to the linear growth of the current in inductor L.

Figure 2:
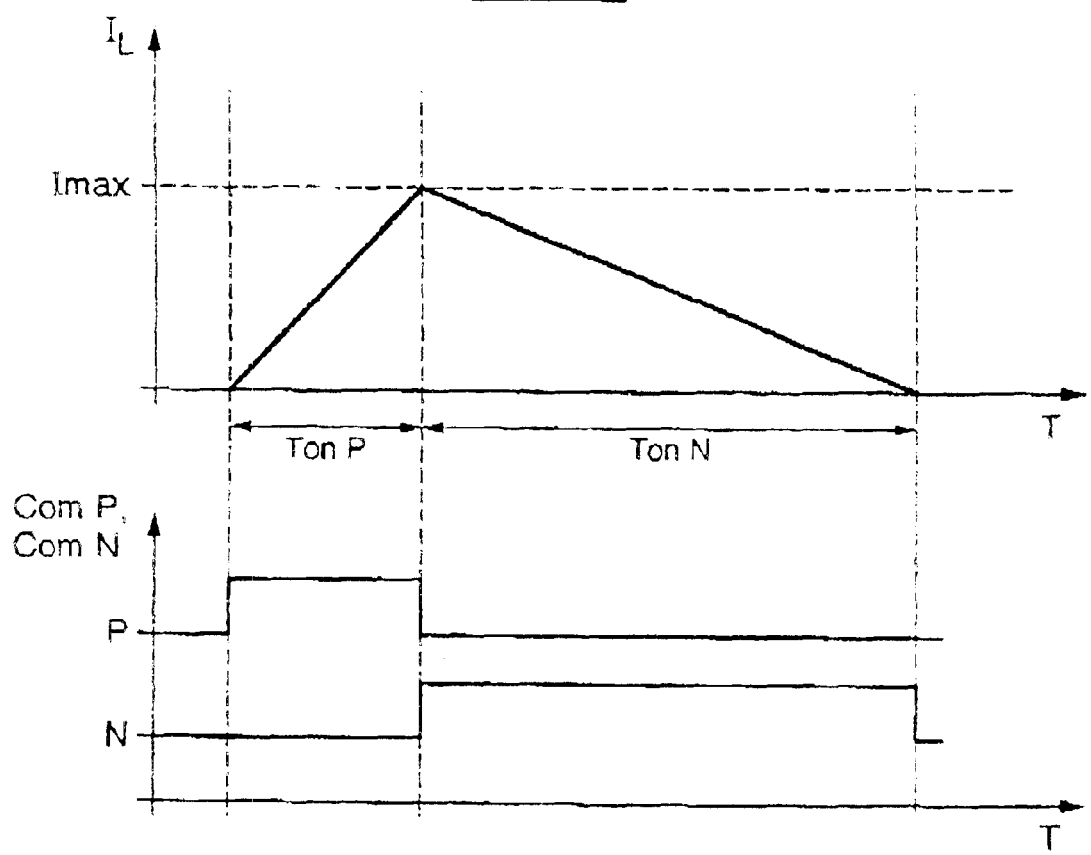
FIG. 2 shows the variation of the current circulating in the inductor and the variation of the control signals of the first and second changeover switches for the circuit of FIG. 1.

Referring again to FIG. 2, the current circulating in the inductor of a power supply with a step-down transformer increases at the time of the closing of the first changeover switch according to a slope equal to (Vsup−Vs)/L, and decreases at the time of the closing of the second changeover switch according to a slope equal to −Vs/L.

The maximum current Imax and the periods TonP and TonN, which correspond respectively to the periods during which the first and second changeover switches P and N are passing, thus satisfy the following equations:

$$Imax = TonP \times \frac{Vsup - Vs}{L} \qquad (1)$$

and $$TonN = \frac{-Imax}{-VS/L} \qquad (2)$$

where:

$$TonN = TonP \times \frac{Vsup - Vs}{Vs} \qquad (3)$$

As designed, the periods TonP and TonN also comply with the following conditions:

$$TonP = \frac{Vs}{Ip \times Cp} \qquad (4)$$

and $$TonP = \frac{Vsup - Vs}{In \times Cn} \qquad (5)$$

Thus, in addition to the voltage levels at the terminals of the capacitors Cp and Cn of the control circuit, these periods TonP and TonN only depend on the value of the capacitors Cn and Cp and on the value of the current In and Ip circulating through these capacitors.

Preferably, the values of the currents Ip and Ip are chosen so that they are equal, and so are the values of the capacitors Cp and Cn. Consequently, the periods TonP and TonN satisfy the equality (3) mentioned above.

As can be seen, the respect of this equality makes it possible to control the opening of the first and second changeover switches as soon as the current Ip circulating through the inductor is cancelled. Thus, in embodiments of the present invention, it is possible, without current detectors, to control the switching cells of a switching power supply before the current circulating through the inductor of this power supply becomes negative.

Figure 5:
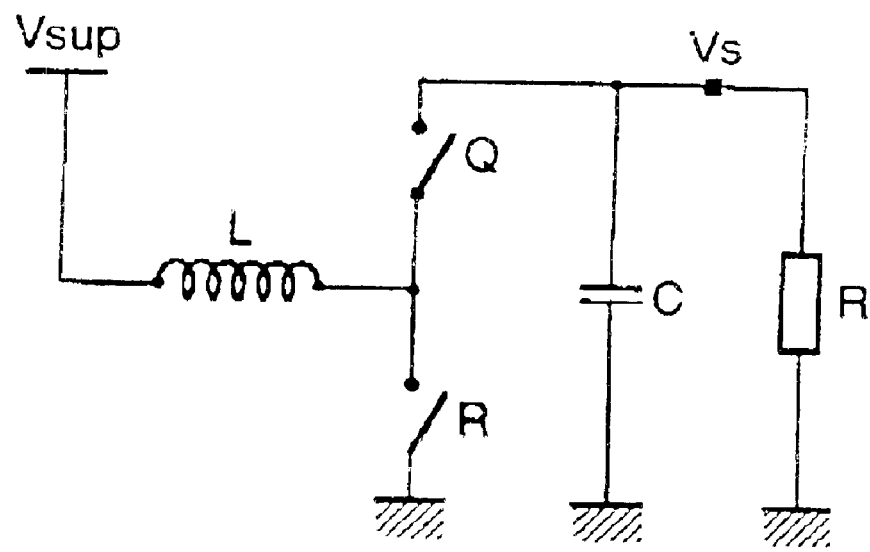
FIG. 5 illustrates the architecture of a step-up transformer to which the present invention can also be applied.

It should be noted that, as mentioned above, the present invention that has just been described is also applicable to controlling step-up transformer power supply circuits, such as that shown in FIG. 5. As can be seen in this figure, such a power supply circuit also contains an inductor L. The inductor L has a first terminal connected to a DC power supply and a second terminal connected to both the output of the power supply by a first changeover switch Q and to ground by a second changeover switch R. Thus, signals analogous to the control signals StartP and StopP and the control signals StartN and StopN can be used to control the first changeover switch Q and the second changeover switch R.

In this type of circuit, the output voltage Vs is greater than the DC voltage Vsup. Using analogous terminology to that used above with the circuit of FIG. 3, the periods TonQ and TonR, which correspond to the conduction time of the changeover switches Q and R, respectively, during which the capacitor Cp is charged from 0V to Vsup, and during which the capacitor Cn is discharged from Vs to Vsup, respectively, comply with the following equation:

$$TonQ = TonR \times \frac{Vsup}{Vs - Vsup} \qquad (6)$$

The present invention can be realized in hardware, software, or a combination of hardware and software. Any processor, controller, or other apparatus adapted for carrying out the functionality described herein is suitable. A typical combination of hardware and software could include a general purpose processor (or a controller) with a computer program that, when loaded and executed, carries out the functionality described herein.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A control device for a switching power supply having an output that supplies an output voltage, the switching power supply including an inductor and two changeover switches for controlling coupling of the inductor, said control device comprising:

a first capacitor for charging with continuous current from a 0V voltage level;

a second capacitor for discharging of the continuous current from a predetermined voltage level that is greater than the voltage level of a DC power supply; and a comparison circuit for comparing the output voltage of the switching power supply with voltage levels of the first and second capacitors and generating control signals for controlling the two changeover switches of the switching power supply.

2. The control device according to claim 1, wherein the comparison circuit includes a first comparator having one terminal coupled to the output of the switching power supply and another terminal that receives the voltage level of the first capacitor.

3. The control device according to claim 2, wherein the comparison circuit includes a second comparator having one terminal coupled to the output of the switching power supply and another terminal that receives the voltage level of the second capacitor.

4. The control device according to claim 1, wherein the comparison circuit includes a second comparator having one terminal coupled to the output of the switching power supply and another terminal that receives the voltage level of the second capacitor.

5. A switching power supply having an output that supplies an output voltage, said switching power supply comprising:

first and second changeover switches;

an inductor coupled to a DC power supply by the first changeover switch and coupled to ground by the second changeover switch; and a control circuit for controlling the first and second changeover switches, the control circuit including:

a first capacitor for charging with continuous current from a 0V voltage level;

a second capacitor for discharging of the continuous current from a predetermined voltage level that is greater than the voltage level of the DC power supply; and a comparison circuit for comparing the output voltage of the switching power supply with voltage levels of the first and second capacitors and generating control signals for controlling the first and second changeover switches.

6. The switching power supply according to claim 5, wherein the comparison circuit of the control circuit includes a first comparator having one terminal coupled to the output of the switching power supply and another terminal that receives the voltage level of the first capacitor.

7. The switching power supply according to claim 6, wherein the comparison circuit of the control circuit includes a second comparator having one terminal coupled to the output of the switching power supply and another terminal that receives the voltage level of the second capacitor.

8. The switching power supply according to claim 5, wherein the comparison circuit of the control circuit includes a second comparator having one terminal coupled to the output of the switching power supply and another terminal that receives the voltage level of the second capacitor.

9. A switching power supply having an output that supplies an output voltage, said switching power supply comprising:

first and second changeover switches;

an inductor having a first terminal coupled to a DC power supply and a second terminal coupled to the output of the switching power supply by the first changeover switch and coupled to ground by the second changeover switch; and a control circuit for controlling the first and second changeover switches, the control circuit including:

a first capacitor for charging with continuous current from a 0V voltage level;

a second capacitor for discharging of the continuous current from a predetermined voltage level that is greater than the voltage level of the DC power supply; and a comparison circuit for comparing the output voltage of the switching power supply with voltage levels of the first and second capacitors and generating control signals for controlling the first and second changeover switches.

10. The switching power supply according to claim 9, wherein the comparison circuit of the control circuit includes a first comparator having one terminal coupled to the output of the switching power supply and another terminal that receives the voltage level of the first capacitor.

11. The switching power supply according to claim 10, wherein the comparison circuit of the control circuit includes a second comparator having one terminal coupled to the output of the switching power supply and another terminal that receives the voltage level of the second capacitor.

12. The switching power supply according to claim 9, wherein the comparison circuit of the control circuit includes a second comparator having one terminal coupled to the output of the switching power supply and another terminal that receives the voltage level of the second capacitor.

13. A method for controlling a switching power supply having an output that supplies an output voltage, the switching power supply including an inductor, two changeover switches for controlling coupling of the inductor, and a control circuit for controlling the changeover switches, said method comprising the steps of:

charging a first capacitor with continuous current from a 0V voltage level;

discharging a second capacitor of the continuous current from a predetermined voltage level that is greater than the voltage level of a DC power supply; and comparing the output voltage of the switching power supply with voltage levels of the first and second capacitors and generating control signals for controlling the first and second changeover switches based on the comparison.

14. The method according to claim 13, wherein the comparing step includes the sub-step of comparing the output of the switching power supply with the voltage level of the first capacitor.

15. The method according to claim 14, wherein the comparing step further includes the sub-step of comparing the output of the switching power supply with the voltage level of the second capacitor.

16. The method according to claim 13, wherein the comparing step includes the sub-step of comparing the output of the switching power supply with the voltage level of the second capacitor.

* * * * *